United States Patent
Chang et al.

(10) Patent No.: US 8,009,986 B2
(45) Date of Patent: Aug. 30, 2011

(54) OPTICAL NODE FOR MESH-TYPE WDM OPTICAL NETWORK

(75) Inventors: Sun Hyok Chang, Daejeon (KR); Hwan Seok Chung, Daejeon (KR); Sang Soo Lee, Daejeon (KR); Kwangjoon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 850 days.

(21) Appl. No.: 11/810,896

(22) Filed: Jun. 7, 2007

(65) Prior Publication Data

US 2008/0118245 A1    May 22, 2008

(30) Foreign Application Priority Data

Nov. 17, 2006 (KR) .................. 10-2006-0114095

(51) Int. Cl.
*H04J 14/02* (2006.01)
(52) U.S. Cl. ............................. 398/83; 398/82; 398/79
(58) Field of Classification Search .............. 398/79, 398/83, 82
See application file for complete search history.

(56) References Cited

U.S. PATENT DOCUMENTS

| | | | |
|---|---|---|---|
| 5,450,224 A | 9/1995 | Johansson | |
| 6,493,119 B1 | 12/2002 | Kuo et al. | |
| 6,868,201 B1 * | 3/2005 | Johnson et al. ............... | 385/24 |
| 6,892,032 B2 | 5/2005 | Milton et al. | |
| 6,941,073 B2 | 9/2005 | McGuire | |
| 7,650,075 B2 * | 1/2010 | Kikuchi ........................ | 398/83 |
| 7,751,714 B2 * | 7/2010 | Zhong et al. .................. | 398/83 |
| 7,826,748 B2 * | 11/2010 | Yang et al. .................... | 398/83 |
| 2002/0131116 A1 * | 9/2002 | Shimomura et al. .......... | 359/124 |
| 2004/0208542 A1 * | 10/2004 | Peddanarappagari et al. .. | 398/45 |
| 2004/0258411 A1 * | 12/2004 | Al-Salameh et al. .......... | 398/83 |
| 2008/0013954 A1 * | 1/2008 | Boduch et al. ................ | 398/83 |
| 2008/0118245 A1 * | 5/2008 | Chang et al. .................. | 398/79 |
| 2008/0131130 A1 * | 6/2008 | Chang et al. .................. | 398/83 |
| 2008/0181605 A1 * | 7/2008 | Palacharla et al. ............ | 398/50 |
| 2008/0260386 A1 * | 10/2008 | Boduch et al. ................ | 398/83 |
| 2008/0292310 A1 * | 11/2008 | Li ................................... | 398/5 |
| 2009/0180779 A1 * | 7/2009 | Boduch et al. ................ | 398/83 |
| 2011/0076016 A1 * | 3/2011 | Wisseman ..................... | 398/48 |

* cited by examiner

*Primary Examiner* — Shi K Li
*Assistant Examiner* — Oommen Jacob
(74) *Attorney, Agent, or Firm* — Blakely, Sokoloff, Taylor & Zafman

(57) ABSTRACT

An optical node capable of supporting a mesh-type optical network is provided. The node includes: N ROADMs, which separate specific wavelength channels from a multiple wavelength channel optical signal that is input from any node constituting the optical network, allows the rest of the wavelength channels to be passed, and combine another added wavelength channel with the passed wavelength channel to allow the combined wavelength channel to be passed; an N×1 optical switch which selects the specific wavelength channel separated from one of the N ROADMs and inputs the specific wavelength channel into an optical transceiver and selects one of the N ROADMs and connects a wavelength channel that is output from the optical transceiver to the selected ROADM; and an electrical cross connect switch which drops a part of electrical signal bandwidth of the specific wavelength channels separated by the ROADM, which is converted into the electrical signals in the optical transceiver, toward an external client and combines the rest of the electrical signal bandwidth with a electrical signal added by the external client to form an electrical signal bandwidth of a wavelength channel and output the electrical signal to the optical transceiver. Accordingly, optical fiber inputs and outputs in various directions can be supported, and the number of WDM transceivers used for each node is remarkably reduced, thereby improving efficiency and economical efficiency of a network.

5 Claims, 4 Drawing Sheets

PRIOR ART

FIG. 3                                    PRIOR ART
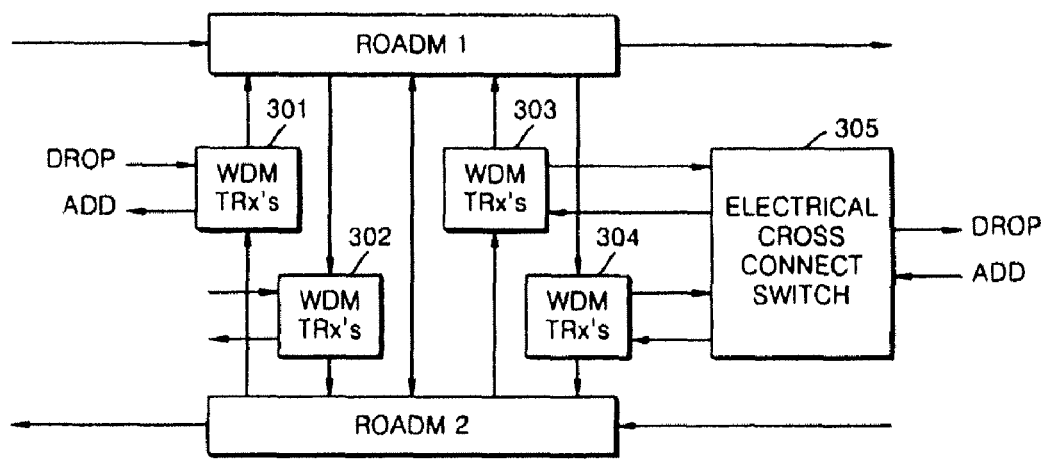
FIG. 4
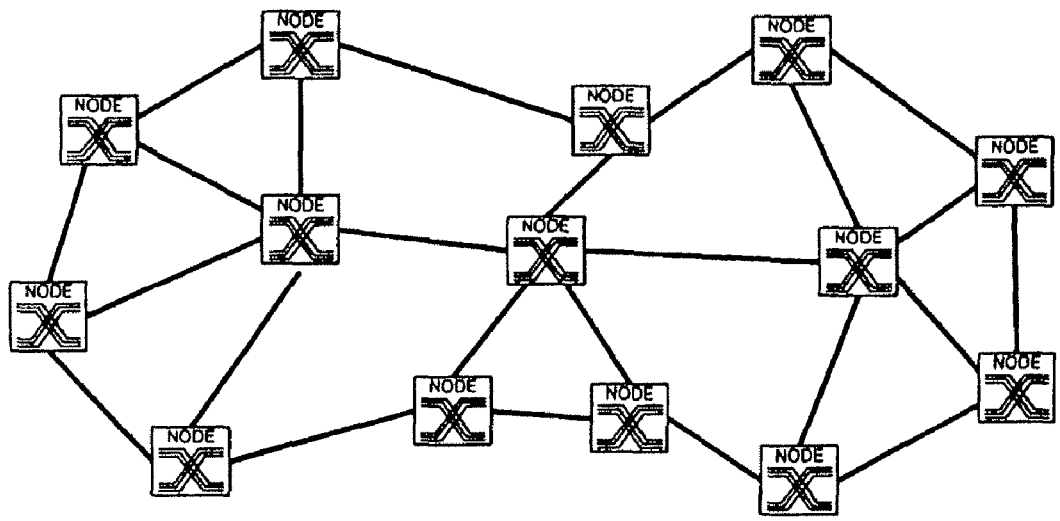

US 8,009,986 B2

OPTICAL NODE FOR MESH-TYPE WDM OPTICAL NETWORK

CROSS-REFERENCE TO RELATED PATENT APPLICATION

This application claims the benefit of Korean Patent Application No. 10-2006-0114095, filed on Nov. 17, 2006, in the Korean Intellectual Property Office, the disclosure of which is incorporated herein in its entirety by reference.

BACKGROUND OF THE INVENTION

1. Field of the Invention

The present invention relates to a node structure capable of supporting a mesh-type optical network, and more particularly, to an optical node capable of supporting a mesh-type optical network in a wavelength division multiplexing (WDM) optical transmission system.

2. Description of the Related Art

As demand for large transmission capacities has rapidly increased, a wavelength division multiplexing (WDM) optical transmission system has been developed. The WDM optical system is considered as a solution for satisfying this demand. In the WDM optical transmission technique, a plurality of wavelength channels are concurrently transmitted in an optical fiber. For example, when a wavelength channel has a bit rate of 10 Gb/s, and fifty wavelengths are concurrently transmitted, the transmission capacity is 500 Gb/s. Accordingly, WDM is convenient for high capacity transmission.

In an optical network which uses the WDM optical transmission technique, an adding or dropping operation for adding or dropping wavelength channels is required in the network node so as to increase the efficiency and flexibility of the network. In a fixed optical add-drop multiplexing (F-DADM) technique, the wavelength of an adding or dropping operation of a wavelength channel is determined by the fixed wavelength filters in a specific node.

However, a reconfigurable optical add-drop multiplexing (ROADM) technique is needed for efficiency of the optical network and economical use of network resources. When the ROADM technique is used, an adding or dropping operation of any channel can be performed at any node, and accordingly, the network resources can be more effectively used. In order to embody the ROADM technique, various optical switches have been developed. More particularly, a technique of a wavelength blocker (WB), a wavelength selective switch (WSS), or an integrated planar lightwave circuit switch (I-PLC switch) has been popular in the markets. On the other hand, existing optical networks mainly have simple topologies, such as a point-to-point topology, a single ring topology or a bidirectional ring topology.

FIG. 1 is a schematic diagram illustrating a ring type bidirectional optical network. FIG. 2 is a schematic diagram illustrating an optical network having a shape obtained by combining two ring type bidirectional optical networks of FIG. 1 with each other.

Referring to FIG. 1, four nodes including a node 101 are connected to one another through an optical fiber 103. Each node includes two inputs and two outputs. An optical transmission signal starts from a specific node and proceeds in a direction 104 or 105 through the optical fiber 103. In the optical transmission signal, a plurality of wavelength channels is combined using a WDM technique and passed through an optical fiber. A reference numeral 102 represents an adding or dropping operation of wavelength channels at each node.

Referring to FIG. 2, a node 201, which connects two ring networks, includes four inputs and four outputs. Therefore, an optical signal, which proceeds in the left ring network, can shift to the right ring network. The optical signal can also shift in the opposite manner.

FIG. 3 illustrates an existing node structure used for the bidirectional ring type optical network of FIG. 1.

Referring to FIG. 3, some of the wavelength channels dropped in a ROADM 1 directly are connected to an external client interface through a transceiver 302 so as to process signals having units of a wavelength channel. Some other wavelength channels are connected to the external client interface from an electrical cross connect switch 305 through a transceiver 304 so as to process signals being less than the wavelength channel.

On the contrary, signals transmitted from an electrical cross connect switch 305 may be converted into an optical signal in the transceiver 303 and added to the ROADM 1. Signals transmitted from the client interface may be added to the ROADM 1 through the transceiver 301.

The wavelength channels other than the added/dropped wavelength channels pass through the ROADM 1 as the optical signal. An operation of a ROADM 2 is basically the same as that of the ROADM 1 except that the signal direction of the ROADM 2 is opposite to that of the ROADM 1.

In the electrical cross connect switch 305, signals with data rates less than the wavelength channel are aggregated and/or groomed. That is, in order to transmit signals with data rates less than the wavelength channel to an external node, the electrical cross connect switch 305 changes the capacities of the signals into capacities that are suitable for transmitting the signals through the wavelength channel.

In the generally used node structure of the bidirectional ring type optical network of FIG. 3, the wavelength of the transceiver 301 is different from that of the transceiver 303. Specifically, the wavelength channel passing through the electrical cross connect switch and the wavelength channel which accesses the client interface without passing through the electrical cross connect switch have to be previously determined. When the optical network has a small scale, the demand for the wavelength channels can be estimated. However, when the optical network has a large scale, and traffic increases, it is impossible to distinguish the wavelength channels in the aforementioned manner. In addition, in said node structure, since the transceivers 301 and 302 have to have the same WDM wavelength channel, and the transceivers 303 and 304 have to have the same WDM wavelength channel to support bidirectional flow, two transceivers having the same wavelength are needed.

SUMMARY OF THE INVENTION

The present invention provides an optical node capable of supporting a mesh-type network, which can support input and output of an optical fiber in various directions and remarkably reduce the number of WDM optical transceiver.

Other objects and advantages of the present invention will be understood in the following description, and more clearly understood in embodiments of the present invention. In addition, it is easily understood that the objects and advantages of the present invention can be embodied by means and their combination defined by the appended claims.

According to an aspect of the present invention, there is provided an N×N optical node capable of supporting a mesh-type optical network, the optical node comprising: N ROADMs, which separate specific wavelength channels from a multiple wavelength channel optical signal that is input from any node constituting the optical network, allows the rest of the wavelength channels to be passed, and combine another added wavelength channel with the passed wavelength channel to allow the combined wavelength channel to be passed; an N×1 optical switch which selects the specific wavelength channel separated from one of the N ROADMs and inputs the specific wavelength channel into an optical transceiver and selects one of the N ROADMs and connects a wavelength channel that is output from the optical transceiver to the selected ROADM; and an electrical cross connect switch which drops a part of electrical signal bandwidth of the specific wavelength channels separated by the ROADM, which is converted into the electrical signal in the optical transceiver, toward an external client and combines the rest of the electrical signal bandwidth with a electrical signal added by the external client to form an electrical signal bandwidth of a wavelength channel and output the electrical signal to the optical transceiver.

In the above aspect of the present invention, the ROADM may add or drop the optical signal in units of a wavelength channel. In addition, the ROADMs may directly transmit and receive each other the optical signal of the wavelength channel.

In addition, the optical transceiver may interconvert the optical signal and the electrical signal, and outputs the optical signal of a wavelength channel.

In addition, the electrical cross connect switch may drop all the electrical signals in the specific wavelength channel toward the external client and outputs to the optical transceiver all the signals added by the external client with a unit of a wavelength channel.

BRIEF DESCRIPTION OF THE DRAWINGS

The above and other features and advantages of the present invention will become more apparent by describing in detail exemplary embodiments thereof with reference to the attached drawings in which:

FIG. 3 illustrates an existing node structure used for the bidirectional ring type optical network of FIG. 1;

FIG. 4 is a schematic diagram illustrating a mesh-type optical network according to an embodiment of the present invention;

DETAILED DESCRIPTION OF THE INVENTION

Figure 1:
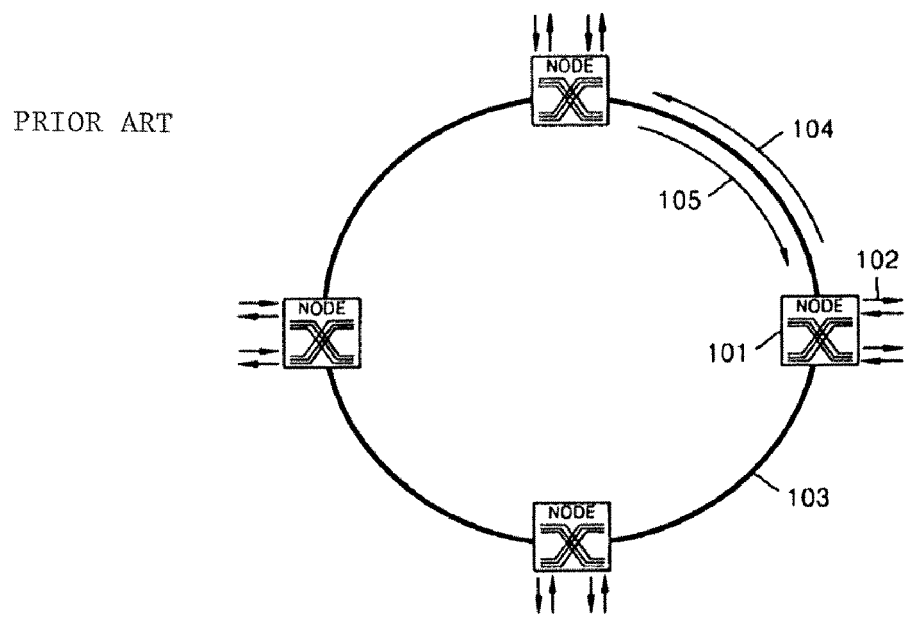
FIG. 1 is a schematic diagram illustrating a ring type bidirectional optical network.
Figure 2:
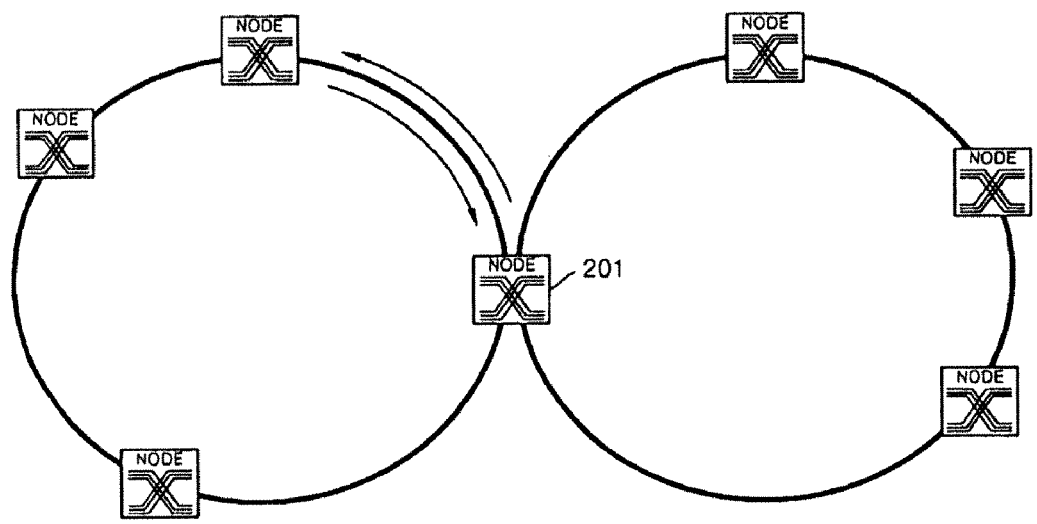
FIG. 2 is a schematic diagram illustrating an optical network having a shape obtained by combining two ring type bidirectional optical networks of FIG. 1 with each other.

Hereinafter, preferred embodiments of the present invention will be described in detail with reference to the attached drawings. Like reference numerals in the drawings denote like elements. When it is determined that the detailed descriptions of known techniques or structures related to the present invention depart from the scope of the invention, the detailed descriptions will be omitted.

FIG. 4 is a schematic diagram illustrating a mesh-type optical network according to an embodiment of the present invention. Since the network may include 2 to 8 or more inputs and outputs, the structure of the node may be complicated. Accordingly, in the present invention, there is provided a node structure capable of supporting a mesh-type network, which has an economical advantage since the mesh-type network can support optical fiber inputs and outputs from various directions and remarkably reduce the number of the WDM optical transceiver TRxs.

Figure 5:
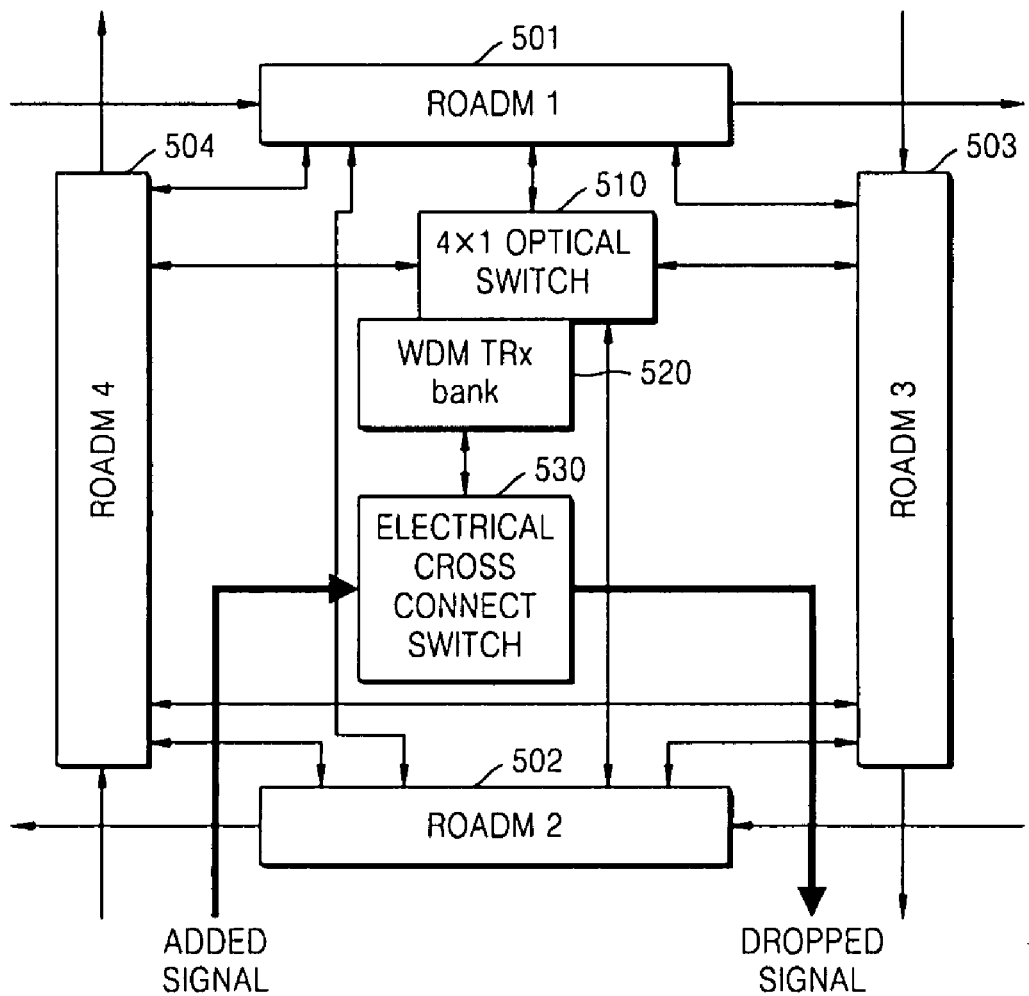
FIG. 5 illustrates a structure of a node used for a mesh-type optical network according to an embodiment of the present invention.

FIG. 5 illustrates a structure of a node used for a mesh-type optical network according to an embodiment of the present invention. In the current embodiment, the node is assumed to be a 4×4 node having four inputs and four outputs.

The optical node according to an embodiment of the present invention includes four ROADMs 501 to 504 which separate (or drop) and combine (or add) a part of the multiplexed wavelength channels, a 4×1 optical switch 510 which selects a wavelength channel signal dropped in any one of the four ROADMs, an optical transceiver 520 which converts an optical signal into an electrical signal or converts an electrical signal into an optical signal in an opposite manner, and an electrical cross connect switch 530 which drops a part of the electrical signal bandwidth of the wavelength channel through a client interface to an external client and combines the rest of the electrical signal bandwidth with an add signal input from the external client to form electrical signals in units of a wavelength channel.

Figure 6:
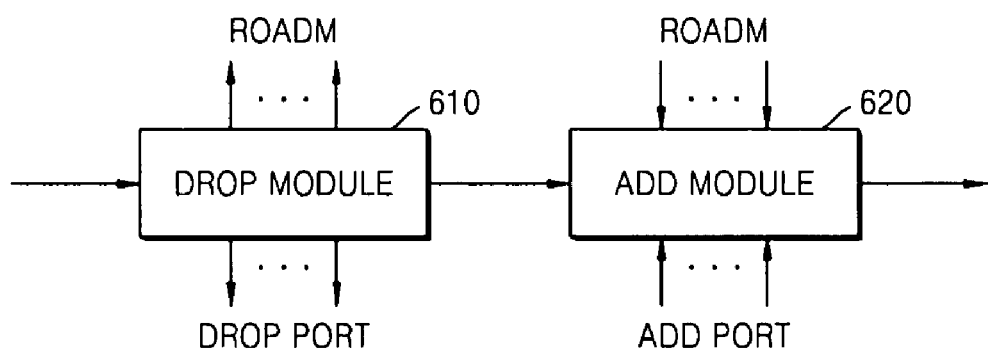
FIG. 6 illustrates a reconfigurable optical add drop multiplexer (ROADM) optical switch constructed by including a drop module and an add module of a node according to an embodiment of the present invention.

Each ROADM 501 to 504 basically includes a structure of FIG. 6. Since the ROADMs 501 to 504 each have the same structure and the same functions, only the ROADM 501 will be described.

Referring to FIG. 6, the ROADM 501 includes a drop module 610 for dropping some wavelength channels and an add module 620 for adding some of wavelength channels.

The ROADM 501 can control a direction in which the WDM wavelength channel proceeds by controlling the wavelength channel which is passed through, added, or dropped.

The drop module 610 and the add module 620 may be embodied as a wavelength selective switch (WSS) and a WSS, a WSS and an optical fiber coupler, or an optical fiber coupler and a WSS, so as to allow an add and/or drop operation to be performed in units of a wavelength channel.

The wavelength dropped in the drop module 610 may be connected to a drop port or to another ROADM in another direction. In the add module 620, the wavelength from the add port and/or another ROADM in another direction is added and transmitted to an output optical fiber. It is possible to output any wavelength to any port (drop) or input any wavelength to any port (add) by using the WSS.

Returning to FIG. 5, the first ROADM 501 transmits the dropped wavelength channel to the optical switch 510. The first ROADM 501 combines the wavelength channel added from the optical switch 510 with the optical signal that passes through the ROADM 501 and transmits the combined wavelength channels.

In addition, since the plurality of ROADMs are directly connected to one another to add/drop the optical signal of the wavelength channel to another ROADM in another direction, it is possible to change the optical path of the wavelength channel into another direction.

The 4×1 optical switch 510 selects the wavelength channel signal dropped in one of the four ROADMs, selects one of the four ROADMs and connects the selected ROADM to a wavelength channel signal output from the optical transceiver 520, which will be described below, and transmits the wavelength channel signal. The 4×1 optical switch 510 according to the current embodiment may expand to an n×1 optical switch in an n×n (n is the number of inputs or outputs) mesh node.

Up to recently, various types of optical switches which can perform switching in units of a wavelength have been developed. More particularly, an optical switch such as a wavelength blocker (WB), a wavelength selective switch (WSS), or an integrated planar lightwave circuit switch (I-PCL switch), has been spotlighted. In the present invention, the WSS may be used to support the mesh node.

The optical switch 510 selects the wavelength channel signal dropped in any ROADM among the four ROADMs and connects the wavelength channel signal to the optical transceiver 520.

The optical transceiver 520 has functions of converting the dropped wavelength channel optical signal selected by the optical switch 510 into an electrical signal and converting the electrical signal output from the electrical cross connect switch 505, which will be described below, into the optical signal.

The optical transceiver 520 converts the wavelength channel optical signal, which is input from the optical switch 510, into the electrical signal and outputs the electrical signal to the electrical cross connect switch 530. The optical signal output from the optical transceiver 520 may be a predetermined single wavelength channel having a fixed wavelength value or a variable wavelength channel.

The electrical cross connect switch 530 drops a part of the electrical signal bandwidth output from the optical transceiver 520 and transmits the dropped electrical signals to the external client through the client interface. The electrical cross connect switch 530 combines the electrical signal added by the external client with the rest of the electrical signals that are not dropped. Here, when a signal with a unit of a wavelength channel is formed, the signal is transmitted to the optical transceiver 520 again. Since the electrical cross connect switch 530 includes functions of aggregating and grooming signals with units of data rates less than the wavelength channel, the electrical cross connect switch 530 has functions of reconstructing, grooming, and cross connecting the wavelength channels. In addition, the electrical cross connect switch 530 may enable all the bandwidth of the wavelength channels to be dropped. The electrical cross connect switch 530 may receive the wavelength channels from the external client and enable all the bandwidth of the wavelength channels which are input from the external client, to be added.

Figure 7:
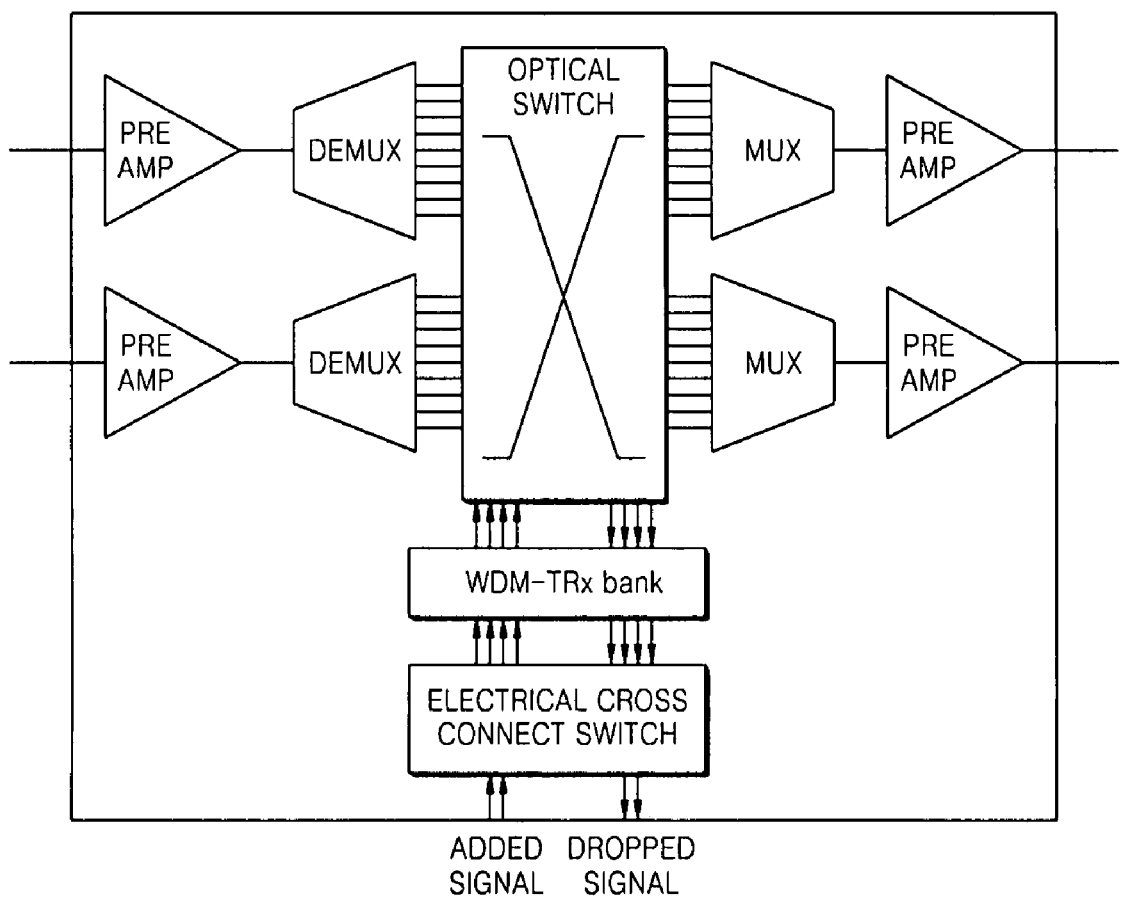
FIG. 7 illustrates a node structure used for a mesh-type optical network according to another embodiment of the present invention.

FIG. 7 illustrates a mesh node according to another embodiment of the present invention, which has the same function as the node FIG. 5. In this node, an optical switch includes m×m (at least, m>100) input and output ports, and any input can be output to any output port.

In the mesh-type optical network according to an embodiment of the present invention, since in a node capable of supporting inputs and outputs of the n×n (n>=2) optical fiber, all the add/drop signals of the ROADM pass through the electrical cross connect switch due to the control of the optical switch, the number of WDM transceivers used for each node can be remarkably reduced, thereby improving the efficiency of a network and the economical efficiency.

In addition, optical fiber inputs and outputs from various directions can be supported by the optical transmission method according to an embodiment of the present invention.

In addition, since in the present invention, a plurality of ROADMs may directly transmit and receive signals without passing through the n×1 optical switch, the optical transceiver, and the electrical cross connect switch, it is advantageous that a new optical path is set up for recovery, when a problem occurs in an optical path.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An N×N optical node capable of supporting a mesh-type optical network, where N is an integer greater than 1, the optical node comprising:

N ROADMs, wherein each ROADM includes a drop module and an add module, the drop module separates specific wavelength channels from a multiple wavelength channel optical signal that is input from any directly connected node constituting the optical network and allows the wavelength channels not separated from the multiple wavelength channel optical signal to be passed, the add module combines added wavelength channels with the passed wavelength channels to allow the combined wavelength channel to be passed;

an N×1 optical switch connected to the drop module and the add module of each ROADM, wherein the N×1 optical switch selects a specific wavelength channel separated by the drop module of one of the N ROADMs and inputs the specific wavelength channel into an optical transceiver and selects one of the N ROADMs and connects a wavelength channel that is output from the optical transceiver to the selected ROADM through the add module of the selected ROADM; and an electrical cross connect switch which drops a part of electrical signal bandwidth of the specific wavelength channels separated by the drop module of the selected ROADM, which is converted into the electrical signals in the optical transceiver, toward an external client and combines the rest of the electrical signal bandwidth with a electrical signal added by the external client to form an electrical signal bandwidth of a wavelength channel and output the electrical signal to the optical transceiver.

2. The optical node of claim 1, wherein the add module of each ROADM is capable of adding the optical signal in units of a wavelength channel and the drop module of each ROADM is capable of dropping the optical signal in units of a wavelength channel.

3. The optical node of claim 1, wherein the optical transceiver interconverts the optical signal and the electrical signal, and outputs the optical signal of the wavelength channel.

4. The optical node of claim 1, wherein the electrical cross connect switch drops all the electrical signal in the specific wavelength channel toward the external client and outputs to the optical transceiver all the signals added by the external client with a unit of a wavelength channel.

5. The optical node of claim 1, wherein the optical signal of the wavelength channel is directly transmitted and received among the ROADMs.

* * * * *